(No Model.)
H. C. HANSEN.
COVER FOR PAILS.
No. 577,747. Patented Feb. 23, 1897.
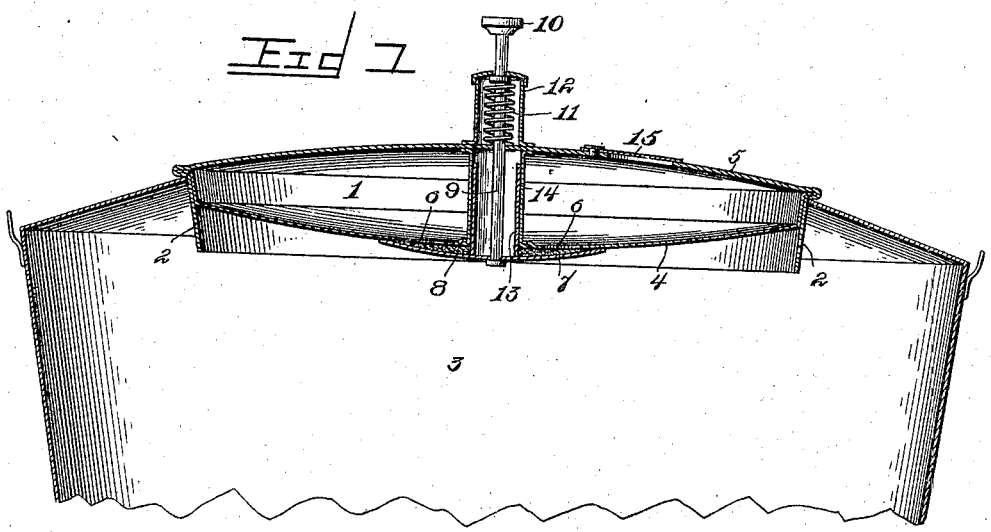
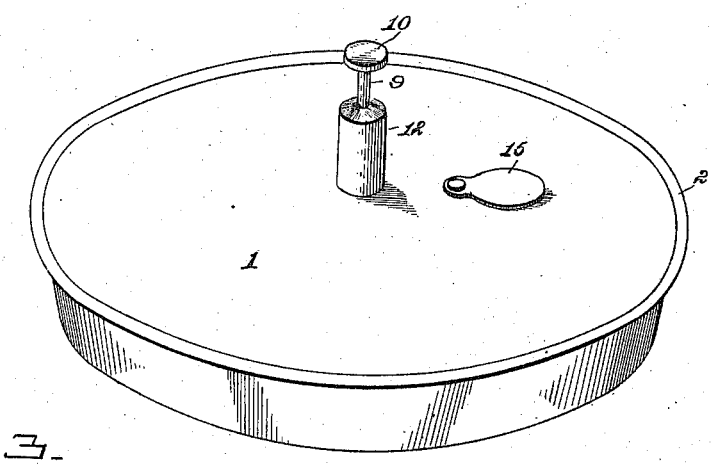
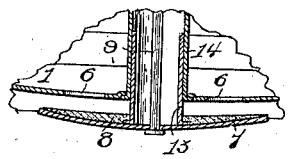
Witnesses
Inventor
Hans C. Hansen.
By his Attorneys,

UNITED STATES PATENT OFFICE.

HANS CHRISTIAN HANSEN, OF ITHACA, NEW YORK.

COVER FOR PAILS.

SPECIFICATION forming part of Letters Patent No. 577,747, dated February 23, 1897.

Application filed March 20, 1896. Serial No. 584,161. (No model.)

*To all whom it may concern:*

Be it known that I, HANS CHRISTIAN HANSEN, a citizen of the United States, residing at Ithaca, in the county of Tompkins and State of New York, have invented a new and useful Cover for Pails, &c., of which the following is a specification.

My invention relates to a sanitary cover for slop-pails and similar vessels, adapted to facilitate the introduction of water or a disinfectant into the vessel without removing the cover, and also designed to provide for keeping a supply of water at all times contiguous to the vessel to prevent the escape of effluvia.

The objects and advantages of this invention will appear in the following description, and the novel features thereof will be particularly pointed out in the appended claim.

In the drawings, Figure 1 is a vertical central section of a cover embodying my invention applied to a pail. Fig. 2 is a perspective view of the cover detached. Fig. 3 is a detail section of the valve and contiguous parts, said valve being shown open.

Similar numerals of reference indicate corresponding parts in all the figures of the drawings.

The cover 1 is provided with the usual depending flange 2 to fit snugly in the top of the vessel 3, and within said flange is arranged a plate 4, forming the bottom of a reservoir or receptacle, of which the top 5 of the cover forms the upper wall. Thus the cover is hollow to form a water reservoir or receptacle equal in area with the opening in the top of the vessel to which the cover is applied.

The bottom of the reservoir or receptacle is provided with one or more outlet-openings 6, covered and normally closed by a valve-disk 7, having a superposed packing-disk 8, and said valve-disk is attached to the lower end of a valve-stem 9, which extends upward through an opening in the upper side of the reservoir and terminates in a button or knob 10. The valve is normally held closed by means of a spring 11, arranged in a tubular spring-casing 12 on top of the cover. The valve-disk also carries a sleeve 13, which operates in a guide-barrel 14 concentric with the valve-stem.

An inlet-opening in the top of the reservoir is fitted with a pivotal closure 15, which may be displaced with facility to permit the introduction of water into the reservoir.

From the above description it will be seen that water or deodorizing liquid of any kind may be stored in the reservoir and introduced into the vessel when required without removing the cover, and sufficient water may be kept therein to enable the vessel to be rinsed, and thus avoid the necessity of exposing the interior of the vessel until after it has been cleansed. Thus the effluvia is prevented from escaping.

A further advantage of the improved cover resides in its use in connection with vessels in which offensive contents are allowed to remain for a considerable time in that water may be introduced without opening the cover and thus prevent the escape of deleterious gases.

This device is of special utility in connection with vessels used in sick-rooms and hospitals, and an important feature thereof resides in the fact that the means for operating the valve consists of a simple straight rod projecting vertically through the cover, thus avoiding the use of levers and joints which are liable to become choked or disarranged. The moisture contained in the receptacle is entirely excluded from the valve-operating mechanism by the sliding sleeve fitting in the stationary guide-barrel of the cover.

Various changes in the form, proportion, and the minor details of construction may be resorted to without departing from the spirit or sacrificing any of the advantages of this invention.

Having described my invention, what I claim is—

The herein-described hollow cover for vessels forming a reservoir or receptacle and provided, respectively, in its upper and lower sides, with inlet and outlet openings, the outlet-opening being arranged equidistant from the center of the cover, a guide-barrel arranged vertically in the reservoir, a valve arranged to bear against the lower surface of the cover to close said outlet-openings, a valve-stem extending through said guide-barrel, an actuating-spring connected to the valve-stem and housed within a casing in communication with said barrel, and a sleeve secured to and carried by the valve concentric with the stem and fitting to slide in the lower end of the barrel, substantially as specified.

In testimony that I claim the foregoing as my own I have hereto affixed my signature in the presence of two witnesses.

HANS CHRISTIAN HANSEN.

Witnesses:
 FRED H. SMITH,
 GEO. R. WILLIAMS.